United States Patent Office 3,149,155
Patented Sept. 15, 1964

3,149,155
PRODUCTION OF ACID CHLORIDES
Matthias Seefelder, Ludwigshafen (Rhine), Gartenstadt, Germany, assignor to Badische Anilin- & Soda-Fabrik Aktiengesellschaft, Ludwigshafen (Rhine), Germany
No Drawing. Filed June 1, 1959, Ser. No. 817,062
Claims priority, application Germany June 3, 1958
9 Claims. (Cl. 260—544)

This invention relates to a process for the production of carboxylic acid chlorides. The principal improvement of my invention is a novel catalyst for the reaction of alpha,beta-unsaturated carboxylic acids with phosgene.

It is known to prepare fatty acid chlorides by reaction of fatty acids with phosgene. According to British patent specification No. 401,643, halogen fatty acids and unsaturated fatty acids may also be reacted with phosgene to the corresponding carboxylic acid chlorides in the presence of the equivalent amount of an organic base. It is also possible to obtain beta-halogen fatty acid chlorides by reaction of beta-halogen fatty acids with thionyl chloride or phosphorus trichloride (Beilstein, volume II, page 250). Beta-chloro-propionic acid chloride is also obtained by the action of phosgene on ethylene in the presence of aluminum chloride (Gazz., 59, page 580).

Alpha,beta-unsaturated acid chlorides are prepared inter alia by rehalogenation (i.e. transfer of halogen from one compound to another). Thus acrylic acid chloride may be obtained with yields of 70% of the theory by the action of benzoyl chloride on acrylic acid at elevated temperature. There is thus formed in a stoichiometrical amount benzoic acid which must in turn be reconverted into benzoyl chloride, for example the action of thionyl chloride. It is true that alpha,beta-unsaturated acids have also been reacted directly with thionyl chloride and that, for example, cinnamic acid chloride has been prepared in this way. However, it is necessary to use the thionyl chloride in a sevenfold excess (B., 64, page 2220).

It was therefore desirable to find a process by which carboxylic acid chlorides, especially the chlorides of alpha, beta-unsaturated carboxylic acids and of beta-chloro-carboxylic acids can be prepared in a simple way and with good yields.

I have now found that this object is achieved in a more advantageous manner by reacting an alpha-beta-unsaturated carboxylic acid with phosgene at temperatures below 150° C. and in the presence of a novel catalyst containing N,N-disubstituted carbonamide groups.

The catalyst compounds have the general formula

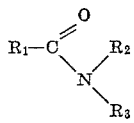

wherein $R_1$ represents a member of the group consisting of hydrogen, alkyl, cycloalkyl, aralkyl, lower alkoxy and lower dialkyl amino radicals, $R_2$ and $R_3$ represent members of the group consisting of alkyl, aralkyl and aryl radicals, and wherein $R_1$, $R_2$ and $R_3$ may also represent, in pairs, common members of a heterocyclic ring which contains the carbonamide nitrogen atom.

The preferred catalysts are disubstituted carboxylic acid amides. They may be derived from lower fatty acids such as formic acid and acetic acid, as well as from higher fatty acids, such as lauric acid. Obviously, amides of fatty acids with a medium number of carbon atoms, as for example with up to 7 carbon atoms, are also suitable. Among the fatty acid amides those derived from fatty acids having up to 4 carbon atoms usually give the best results. Besides fatty acid amides, there may also be used the acid amides of araliphatic carboxylic acids, such as phenylacetic acid. Finally there may also be used amides of cycloaliphatic carboxylic acids, such as hexahydrobenzoic acid.

The suitable compounds may on the other hand be derived from aliphatic, araliphatic and aromatic amines and from polymethylene imines. Of the alkyl-substituted amines those with substituents with up to about 4 carbon atoms and especially those containing ethyl or methyl groups are preferred. The aromatic amines preferably contain the phenyl radical or a phenyl radical substituted by lower alkyl groups. The term "lower alkyl radicals," throughout this specification, means those with up to about 4 carbon atoms. Acid amides derived from cycloaliphatic imines with 5 to about 7 ring members are also well suited as catalysts.

Lactams, such as pyrrolidone, caprolactam and oenanthic lactam, N-substituted by lower alkyl radicals, especially by ethyl or methyl radicals, may also be used as catalysts. Besides carboxylic acid amides and lactams, there may also be used tetrasubstituted ureas and disubstituted urethanes. The alkyl-substituted compounds and especially the compounds substituted by lower alkyl radicals are preferred.

In general the best results are achieved with catalysts which are derived from formic acid on the one hand and from lower aliphatic secondary amines or from cycloaliphatic imines with 5 to 7 ring members on the other hand, and also with lactams N-substituted by lower alkyl radicals.

Suitable catalysts are for example: N,N-dimethylformamide, N,N-diethylformamide, N,N-dibutylformamide, N-formylpiperidine, N,N-diethylacetamide, N-acetylpyrrolidine, N,N-dimethylpropionamide, N,N-dimethylstearic acid amide, N-methylpyrrolidone, N-ethylcarprolactam, N,N-dimethylbenzamide, N-methylacetanilide, N,N-dimethylethyl urethane, tetramethylurea, N-formylpyrrolidine, N-formylhexamethylene imine, N,N'-diformylpiperazine, N,N-dicyclohexylformamide, N-methylformanilide, butyric acid piperidide, butyric acid dipropylamide, isobutyric acid diethylamide, hexahydrobenzoic acid dimethylamide, lauric acid dimethylamide, N-phenylpyrrolidone, and N-cyclohexylpyrrolidone. They are used as such or in the form of their salts, for example the hydrohalides, or in the form of their reaction products with inorganic acid halides, as for example phosgene or phosphorus oxychloride, in amounts which are preferably between 0.5 and 10% by weight.

The alpha,beta-unsaturated carboxylic acids operable in the process according to the invention are well-known compounds. They have the general formula

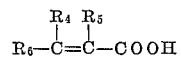

wherein $R_4$, $R_5$ and $R_6$ represent hydrogen atoms, halogen atoms, aliphatic, araliphatic or aromatic radicals and further, in pairs, members of a cycloaliphatic ring, said ring being a cycloalkane ring if $R_4$ and $R_6$ are connected by a polymethylene bridge, and being a cycloalkene ring if $R_4$ or $R_6$ are connected with $R_5$ in the same manner.

Depending on the initial compound and on the conditions used, chlorides of alpha,beta-unsaturated carboxylic acids or of beta-chlorocarboxylic acids can be prepared by the process according to this invention. Beta-chlorocarboxylic acid chlorides are obtained when alpha,beta-unsaturated acids in which $R_4$ in the above formula represents a hydrogen atom whereas $R_5$ and $R_6$ represents hydrogen atoms, halogen atoms, aliphatic, araliphatic or aromatic radicals or together are members of a cycloaliphatic ring, are reacted at temperatures below about 100° C., advantageously between 20° and 80° C. If the beta-chlorocarboxylic acid chlorides thus obtainable are heated in the presence of the said compounds containing carbonamide groups to temperatures above 100° C., preferably between 115° and 150° C., the corresponding alpha, beta-unsaturated carboxylic acid chlorides are formed by the splitting off of hydrogen chloride. It is advantageous simply to heat the reaction mixture to the said temperatures after the end of the reaction with phosgene.

For example the reaction of crotonic acid proceeds in the first stage of the new process according to the equation:

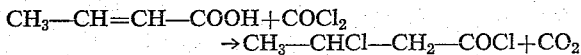

and in the possible second stage it proceeds according to the equation:

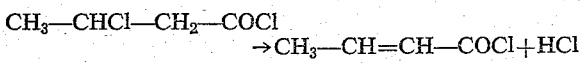

If, however, the initial material is an alpha,beta-unsaturated carboxylic acid in which $R_4$, $R_5$ and $R_6$ represent aliphatic, araliphatic or aromatic radicals or two of them together are members of a cycloaliphatic ring, but in which $R_5$ may also represent a hydrogen atom or a chlorine atom, and $R_6$ a hydrogen atom when $R_4$ represents an aromatic radical, then there is directly obtained the chloride of the alpha,beta-unsaturated carboxylic acid used, even at temperatures below 100° C., e.g. between 50° and 80° C.

Among the alpha,beta-unsaturated carboxylic acids suitable as initial materials the alpha,beta-unsaturated fatty acids are preferred. The aliphatic substituents may be especially alkyl radicals with up to about 4 carbon atoms. The araliphatic radicals in general contain phenyl nuclei which are in any position with respect to an aliphatic chain with up to about 3 carbon atoms. Of the initial compounds with aromatic substituents those are advantageously used which contain phenyl groups or phenyl groups substituted by lower alkyl groups. The aliphatic, araliphatic and aromatic radicals may however contain in the molecule other atoms or groups which are indifferent under the conditions of the process, such as unsaturated carbon-carbon linkages, halogen atoms or alkoxy groups. Of the halogen-substituted alpha,beta-unsaturated carboxylic acids it is preferable to use the chlorocarboxylic acids. The substituents $R_4$, $R_5$ and $R_6$ may also be, in pairs, members of a cycloaliphatic ring, preferably one with 5 to 7 carbon atoms.

Among suitable compounds there may be mentioned by way of example: acrylic acid, alpha-methylacrylic acid, alpha-ethylacrylic acid, crotonic acid, tiglic acid, 2-ethylhexene-2-acid-1, muconic acid, cycloheptene-1-carboxylic acid, alpha-chloroacrylic acid, beta,beta-dimethylacrylic acid, cyclohexylidene-acetic acid and cinnamic acid, alpha-butylacrylic acid, alpha-phenylacrylic acid, alpha-propyl-crotonic acid, alpha-phenyl-crotonic acid, alpha-methyl-cinnamic acid, beta,beta-diphenylacrylic acid, alpha-phenyl-cinnamic acid and cyclopentene-(1)-carboxylic acid-(1).

The process may be carried out continuously or discontinuously. The reaction may be carried out for example by leading phosgene, preferably in an excess of 2 to 10% over the amount theoretically necessary, into a mixture of the unsaturated acid and the catalyst. In many cases, for example in the reaction of an unsaturated carboxylic acid which is solid at room temperature, it is preferable to use an indifferent solvent, such as benzene, toluene or carbon tetrachloride. Chloro-hydrocarbons are the preferred solvents. The reaction is exothermic. The reaction temperature can be regulated by the speed of the supply of the phosgene and by additional cooling, and about 100° C. should preferably not be exceeded. The reaction speed is noticeable at room temperature and even at temperatures below 0° C., as for example at —20° C., and at moderately raised temperatures is so considerable that the phosgene is immediately used up even when supplied in a rapid steam.

When an unsaturated acid of the first-mentioned group has been reacted and it is desired to obtain the beta-chloro-carboxylic acid chloride, the product, after removal of the dissolved hydrogen chloride, can be distilled under reduced pressure, the temperature of the reaction mixture not being allowed to reach 100° C. The distillation catalyst may be used as catalyst for a fresh batch. In many cases it is possible to use the beta-chloro-carboxylic acid chloride directly without distillation.

On the other hand if it is desired to obtain the alpha, beta-unsaturated acid chloride, the reaction mixture is heated to temperatures above 100° C., preferably between 115° and 150° C. It is advantageous to remove the unsaturated acid chloride formed from the reaction mixture by distillation, possibly under reduced pressure.

When an unsaturated acid of the second group has been reacted, the alpha,beta-unsaturated acid chloride is directly obtained and this can also be recovered by distillation.

The beta-chloro-carboxylic acid chlorides and alpha, beta-unsaturated carboxylic acid chlorides obtainable according to the new process are important intermediate products, for example for the production of dyestuffs or plastics.

The following examples will further illustrate this invention but the invention is not restricted to these examples. The parts specified in the examples are parts by weight.

*Example 1*

A rapid stream of phosgene is led into a mixture of 1000 parts of acrylic acid and 15 parts of dimethylformamide. The temperature is not allowed to exceed 70° C. After a total of 1500 parts of phosgene have been led in, the mixture is distilled in vacuo. 1480 parts of beta-chlorpropionic acid chloride of the boiling point 48° C. at 18 mm. Hg are obtained, i.e. 84% of the theory. 60 parts of residue remain which contain the catalyst.

*Example 2*

1100 parts of phosgene are led at 70° C. into a mixture of 860 parts of crotonic acid and 20 parts of N-methyl-pyrrolidone. By subsequent distillation there are obtained 1210 parts of crude beta-chlorobutyric acid chloride and 80 parts of residue which can be used again as catalyst. By rectification of the distillate, pure beta-chlorobutyric acid chloride of the boiling point 51° to 52° C. at 17 mm. Hg are obtained.

*Example 3*

1500 parts of phosgene are led in a powerful stream in the course of 8 hours into a mixture of 1000 parts of anhydrous acrylic acid and 15 parts of dimethylformamide. The temperature of the mixture rises and is kept by external cooling between 60° and 70° C. After all the phosgene has been led in, the mixture is heated to 120° C., the acrylic acid chloride being distilled off through a short column and a dephlegmator fed with brine. 1095 parts of acrylic acid chloride are obtained, i.e. 87% of the theory. In pure distillation it boils between 74° and 76° C. and contains not more than 10 parts of beta-chloropropionic acid chloride.

If phosgene is led into anhydrous acrylic acid which contains no added dimethylformamide, no appreciable reaction is observed.

*Example 4*

770 parts of phosgene are led during 6 hours into a mixture of 500 parts of anhydrous acrylic acid and 50 parts of dimethylformamide at 40° to 50° C.

The mixture is then heated to 120° to 125° C. and the acrylic acid chloride formed is distilled off through a column and a cooler charged with brine.

To the residue from this distillation there is again added 500 parts of acrylic acid and 770 parts of phosgene are led in during 6 hours at 40° to 50° C.

The mixture is again heated to 120° to 125° C. and the acrylic acid chloride recovered as above.

In all 1075 parts of acrylic acid chloride are obtained, that is 85% of the theory.

*Example 5*

550 parts of phosgene are led at 60° to 70° C. into a mixture of 430 parts of crotonic acid and 25 parts of N-methylpyrrolidone.

The reaction mixture is heated to 115° to 120° C. under a pressure of 140 mm. Hg. The crotonic acid chloride which escapes in addition to the hydrogen chloride split off is distilled through a column and condensed in a dephlegmator cooled with brine.

433 parts of distillate are obtained from which by rectification 412 parts of crotonic acid chloride of the boiling point 123° to 125° C. are obtained, that is 79% of the theory. A small amount of beta-chlorbutyric acid chloride remains as a residue.

*Example 6*

350 parts of phosgene are led into a mixture of 300 parts of beta,beta-dimethylacrylic acid and 20 parts of dimethylformamide at 80° C. Then the mixture is distilled under a pressure of 70 mm. Hg. 324 parts of beta,beta-dimethylacrylic acid chloride are obtained, that is 91% of the theory. Upon redistillation, it passes over unitarily between 42° and 43° C. at 11 mm. Hg.

*Example 7*

580 parts of phosgene are led into a mixture of 490 parts of cinnamic acid, 40 parts of N-methylpyrrolidone and 800 parts of carbon tetrachloride at 70° C. The mixture is subjected to fractional distillation, 420 parts of cinnamic acid chloride thereby being obtained. The boiling point is 137° to 138° C. at 15 mm. Hg and the yield is 76% of the theory.

*Example 8*

520 parts of phosgene are led in the course of 4 hours into a mixture of 430 parts of anhydrous methacrylic acid and 10 parts of dimethylformamide, the temperature not being allowed to exceed 70° C. The reaction mixture is then heated to 120° to 130° C. and the methacrylic acid chloride formed is distilled off. The product is condensed with the aid of cooling brine and 476 parts of methacrylic acid chloride are obtained which upon a further distillation has a boiling point of 97° to 99° C.

*Example 9*

35 parts of phosgene are led into a mixture of 42 parts of alpha-butyl-crotonic acid, 6 parts of dimethylformamide and 100 parts of chloroform, the mixture thus becoming heated up to refluxing temperature. When the reaction has ended, the solvent is distilled off and the residue is heated to 120° C. A subsequent distillation in vacuo yields 35 parts of alpha-butyl-crotonic acid chloride of the boiling point 60° to 63° C. at 11 mm. Hg.

*Example 10*

A solution of 70 parts of alpha-phenylcrotonic acid and 8 parts of dimethylformamide in 150 parts of chloroform is heated to refluxing temperature and then 40 parts of phosgene are lead in. After distilling off the solvent, the residue is distilled under reduced pressure, 62 parts of alpha-phenyl-crotonic acid chloride passing over with the splitting off of hydrogen chloride; the boiling point is 116° to 120° C. at 11 mm. Hg.

*Example 11*

100 parts of alpha-chloracrylic acid have 11 parts of dimethylformamide added thereto. 100 parts of phosgene are led into the mixture in the course of 3 hours at 40° C. The reaction product is decomposed by heating under a pressure of 60 to 70 mm. Hg. and the alpha-chloracrylic acid chloride is distilled off through a brine cooler of good efficiency. 103 parts of a crude product are obtained which by redistillation has a boiling point of 25° to 27° C. at 20 mm. Hg.

*Example 12*

220 parts of phosgene are led into a mixture of 144 parts of acrylic acid and 2 parts of N-formylpyrrolidine, the temperature not being allowed to exceed 70° C. The reaction mixture is then heated to 125° to 135° C., 130 parts of acrylic acid chloride thereby passing over.

*Example 13*

In the manner described in Example 12, 144 parts of acrylic acid are reacted with 220 parts of phosgene in the presence of 10 parts of N-formylhexamethylene imine. 115 parts of acrylic acid chloride are obtained.

*Example 14*

In the manner described in Example 12, 144 parts of acrylic acid are reacted with 220 parts of phosgene in the presence of 10 parts of N-methylformanilide. 113 parts of acrylic acid chloride are obtained.

*Example 15*

220 parts of phosgene are led into a mixture of 144 parts of acrylic acid and 15 parts of butyric acid diethylamide at 40° C. The reaction product is then decomposed at temperatures of 120° to 135° C. 136 parts of acrylic acid chloride are obtained.

*Example 16*

In the manner described in Example 15, 144 parts of acrylic acid are reacted with 225 parts of phosgene in the presence of 10 parts of hexahydrobenzoic acid diethylamide. 128 parts of acrylic acid chloride are obtained.

*Example 17*

380 parts of phosgene are led into a mixture of 250 parts of acrylic acid and 15 parts of a complex derived from molar amounts of dimethylformamide and phosphorus oxychloride, the temperature not being allowed to rise above 70° C. The reaction product is then worked up as described in Example 3. 260 parts of acrylic acid chloride are obtained.

*Example 18*

The procedure of Example 5 is followed but 34 parts of N-methylpyrrolidone hydrochloride are used instead of N-methylpyrrolidone. Crotonic acid chloride is obtained in a yield of 78% of the theory.

What I claim is:

1. A process for the production of carboxylic acid chlorides which comprises: reacting phosgene at a temperature between −20° C. and +100° C. with an α,β-unsaturated carboxylic acid of the formula

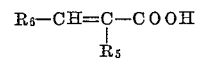

wherein $R_5$ and $R_6$ each represent a member selected from the group consisting of hydrogen, alkyl of 1 to 4 carbon atoms, and chlorine, and wherein $R_5$ and $R_6$ when taken together with the

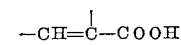

group form a cycloalkene ring of 5 to 7 carbon atoms, in the presence of a catalytic compound of the formula

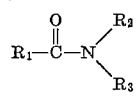

wherein $R_1$ represents a member selected from the group consisting of hydrogen, alkyl of 1 to 17 carbon atoms, cyclohexyl and benzyl, $R_2$ and $R_3$ each represent a member selected from the group consisting of lower alkyl, cyclohexyl, phenyl and phenyl substituted by lower alkyl and wherein $R_1$, $R_2$ and $R_3$ may also represent, in pairs, common members of a heterocyclic ring such that the catalytic compound is a member selected from the group consisting of

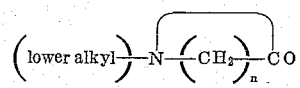

where n is an integer of from 3 to 6, N-phenyl-pyrrolidone, N-cyclohexyl-pyrrolidone, N-formylpiperidine, N-formylpyrrolidine, N-acetylpyrrolidine, N-formylhexamethylene imine, N,N'-diformylpiperazine and butyric acid piperidide; and heating the β-chloro carboxylic acid chloride thus obtained in the presence of said catalytically active substance to a temperature of between 100° C. and 150° C., hydrogen chloride thereby being split off and the corresponding α,β-unsaturated carboxylic acid chloride being formed.

2. A process as claimed in claim 1 wherein the said α,β-unsaturated carboxylic acid is acrylic acid.

3. A process as claimed in claim 1 wherein the reaction of the said α,β-unsaturated carboxylic acid with phosgene is carried out at a temperature of between 20° and 80° C. and wherein the dehydrochlorination of the β-chloro carboxylic acid chloride thereby formed is carried out at a temperature of between 115° and 150° C.

4. A process as claimed in claim 1 wherein said catalytic compound is used in the form of its hydrogen halide salt.

5. A process as claimed in claim 1 wherein said catalytic compound is used in the form of its reaction product with an inorganic acid chloride.

6. A process as claimed in claim 1 wherein said catalytic compound is an N,N-dialkyl substituted fatty acid amide having 1 to 4 carbon atoms in the fatty acid radical and having 1 to 4 carbon atoms in each alkyl radical.

7. A process as claimed in claim 6 wherein the said catalytic compound is N,N-dimethyl formamide.

8. A process for the production of carboxylic acid chlorides which comprises reacting phosgene at a temperature between −20° and +100° C. with an α,β-unsaturated carboxylic acid having the formula

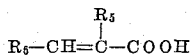

wherein $R_5$ and $R_6$ each represent a member selected from the group consisting of hydrogen, alkyl of 1 to 4 carbon atoms, and chlorine, and wherein $R_5$ and $R_6$ when taken together with the $$-CH=\overset{|}{C}-COOH$$

group form a cycloalkene ring with 5 to 7 carbon atoms, in the presence of a catalytic compound of the formula

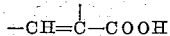

wherein $R_1$ represents a member selected from the group consisting of hydrogen, alkyl of 1 to 17 carbon atoms, cyclohexyl and benzyl, $R_2$ and $R_3$ each represent a member selected from the group consisting of lower alkyl, cyclohexyl, phenyl and phenyl substituted by lower alkyl, and wherein $R_1$, $R_2$ and $R_3$ may also represent, in pairs, common members of a heterocyclic ring such that the catalytic compound is a member selected from the group consisting of

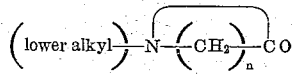

where *n* is an integer of from 3 to 6, N-phenyl-pyrrolidone, N-cyclohexyl-pyrrolidone, N-formylpiperidine, N-formylpyrrolidine, N-acetylpyrrolidine, N-formylhexamethylene imine, N,N'-diformylpiperazine and butyric acid piperidide; and recovering the β-chloro carboxylic acid chloride thus obtained by distillation of the reaction mixture, the temperature of said reaction mixture not exceeding 100° C.

9. A process as claimed in claim 8 wherein said α,β-unsaturated carboxylic acid is acrylic acid, β-chloro propionic acid chloride being the reaction product.

References Cited in the file of this patent

UNITED STATES PATENTS

| 2,396,609 | Schmidt | Mar. 12, 1946 |
| 2,410,541 | Joyce | Nov. 5, 1946 |

FOREIGN PATENTS

| 333,079 | Great Britain | Aug. 7, 1930 |
| 401,643 | Great Britain | 1933 |
| 574,057 | Great Britain | Dec. 19, 1945 |
| 193,399 | Austria | Nov. 25, 1957 |

OTHER REFERENCES

Dyson: Chem. Rev., vol. 4, page 155 (1927).